(12) United States Patent
Agee

(10) Patent No.: US 10,434,506 B1
(45) Date of Patent: Oct. 8, 2019

(54) METHOD FOR ACTIVATION OR REGENERATION OF A CATALYST

(71) Applicant: Emerging Fuels Technology, Inc., Tulsa, OK (US)

(72) Inventor: Kenneth L. Agee, Tulsa, OK (US)

(73) Assignee: Emerging Fuels Technology, Inc., Tulsa, OK (US)

(*) Notice: Subject to any disclaimer, the term of this patent is extended or adjusted under 35 U.S.C. 154(b) by 0 days.

(21) Appl. No.: 16/224,184

(22) Filed: Dec. 18, 2018

(51) Int. Cl.
*B01J 38/10* (2006.01)
*B01J 38/02* (2006.01)
*B01D 5/00* (2006.01)
*C10G 2/00* (2006.01)

(52) U.S. Cl.
CPC .............. *B01J 38/10* (2013.01); *B01D 5/009* (2013.01); *B01J 38/02* (2013.01); *C10G 2/332* (2013.01); *B01D 5/0051* (2013.01); *B01D 5/0054* (2013.01); *C10G 2300/703* (2013.01); *C10G 2300/706* (2013.01)

(58) Field of Classification Search
CPC ............ B01J 38/10; B01J 38/02; B01D 5/009
USPC ......................................................... 502/53
See application file for complete search history.

(56) References Cited

U.S. PATENT DOCUMENTS

| | | | |
|---|---|---|---|
| 4,605,676 A | 8/1986 | Kobylinski et al. | |
| 4,729,981 A | 3/1988 | Kobylinski et al. | |
| 5,585,316 A | 12/1996 | Nay et al. | |
| 5,728,918 A | 3/1998 | Nay et al. | |
| 6,486,220 B1 | 11/2002 | Wright | |
| 6,509,382 B1 | 1/2003 | Ducreux et al. | |
| 6,753,286 B2 | 6/2004 | Clark et al. | |
| 6,753,351 B2 | 6/2004 | Clark et al. | |
| 6,800,579 B2 | 10/2004 | Daage et al. | |
| 6,869,978 B2 | 3/2005 | Wright et al. | |
| 6,919,290 B2 | 7/2005 | Clarkson et al. | |
| 6,962,947 B2 | 11/2005 | Wright et al. | |
| 7,183,329 B2 | 2/2007 | Green et al. | |
| 7,511,080 B2 | 3/2009 | Green et al. | |
| 7,592,289 B2 | 9/2009 | Van Berge et al. | |
| 8,062,992 B2 | 11/2011 | Visagie et al. | |
| 8,067,333 B2 | 11/2011 | Visagie et al. | |
| 8,314,043 B2 | 11/2012 | Lansink Rotgerink et al. | |
| 8,329,765 B2 | 12/2012 | Clarkson et al. | |
| 8,431,502 B2 | 4/2013 | Dejneka et al. | |
| 8,614,158 B2 | 12/2013 | Leviness | |
| 8,729,140 B2 | 5/2014 | Bezemer et al. | |
| 8,809,215 B2 | 8/2014 | Van De Loosdrecht et al. | |
| 9,050,588 B2 | 6/2015 | Inga | |
| 9,180,436 B1 | 11/2015 | Espinoza et al. | |
| 9,259,717 B2 | 2/2016 | Ha et al. | |
| 9,358,526 B2 | 6/2016 | Espinoza et al. | |
| 10,022,692 B2 | 7/2018 | Inga | |

*Primary Examiner* — Edward M Johnson
(74) *Attorney, Agent, or Firm* — Head, Johnson, Kachigian & Wilkinson, PC

(57) ABSTRACT

A method is disclosed for activating or regenerating a Fischer Tropsch catalyst used in a gas-to-liquids process operating in recycle mode. The method permits the use of specific inert gases to adjust the mole weight of the gas so that the recycle compressor designed for normal steady state operation can also be used in the ROR method. Nitrogen and carbon dioxide are specifically excluded for the reduction steps of the ROR method as they have been demonstrated to have a negative effect on the method. Nitrogen is used in the oxidation step with small amounts of oxygen containing gas, preferably air, and may be modified with the addition of argon, helium, or carbon dioxide if the mole weight of the oxidation gas needs to be modified to satisfy the requirements of the compressor.

15 Claims, 1 Drawing Sheet

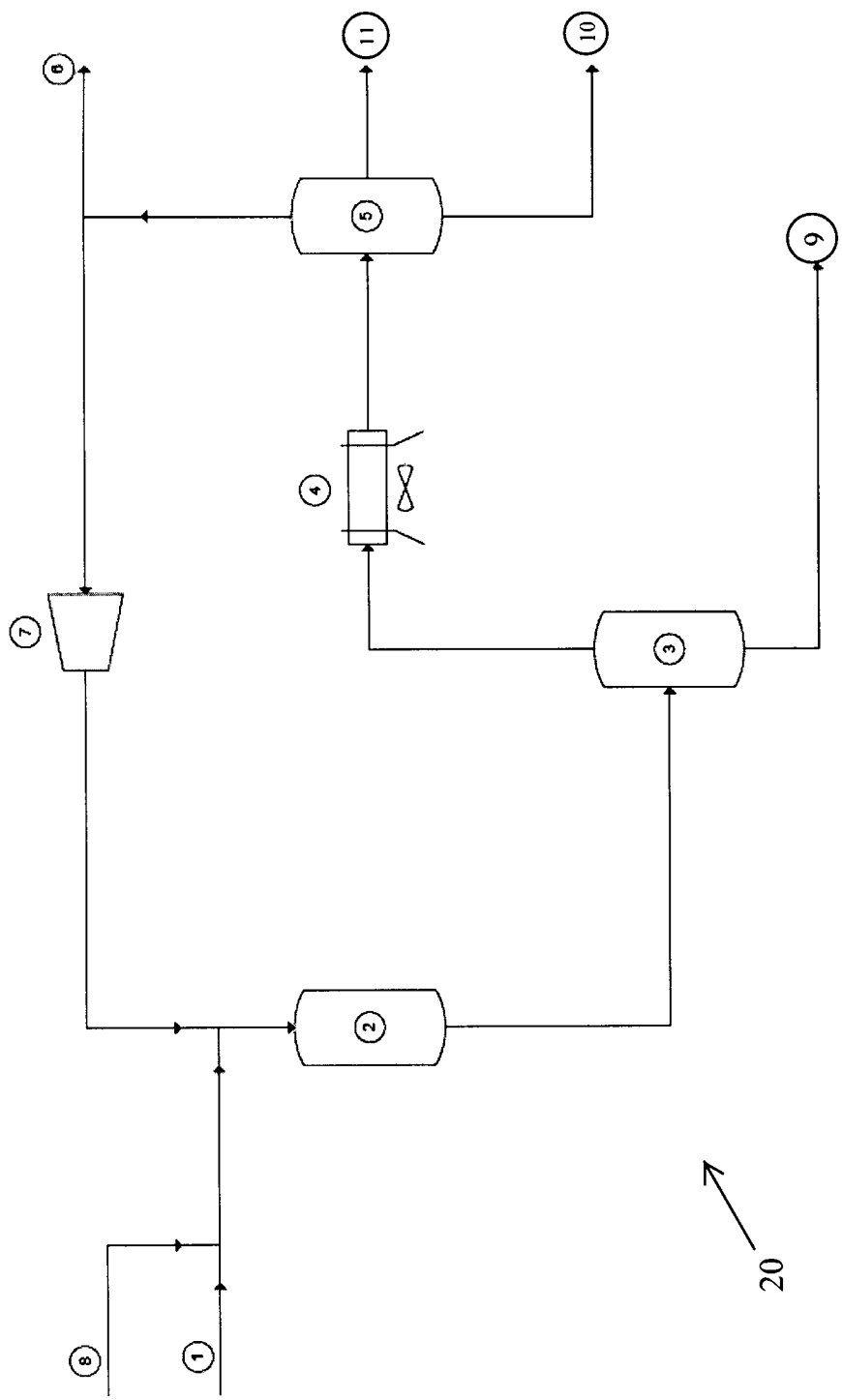

METHOD FOR ACTIVATION OR REGENERATION OF A CATALYST

BACKGROUND OF THE INVENTION

Cross Reference

Not Applicable.

FIELD OF THE INVENTION

This invention relates generally to a method to activate or regenerate a Fischer Tropsch catalyst used for the production of heavy hydrocarbon products from light gaseous hydrocarbon feeds such as natural gas, associated gas, coal seam gas, landfill gas, or biogas.

DESCRIPTION OF THE RELATED ART

Various processes are known for the conversion of light methane-containing gases into normally liquid products such as methanol, higher alcohols, and hydrocarbon fuels and chemicals, particularly paraffinic hydrocarbons. Such processes are directed at the objective of adding value to the light gaseous feedstock by making a transportable, more valuable product such as diesel fuel or jet fuel.

The Fischer Tropsch process can be used to convert such gaseous light hydrocarbon products into more valuable, easily transportable liquid hydrocarbon products. The gaseous feedstock is first converted to synthesis gas comprising carbon monoxide and hydrogen. The synthesis gas is then converted to heavy hydrocarbon products with a Fischer Tropsch catalyst. The heavy hydrocarbon products can be subjected to further workup by hydroprocessing such as hydrocracking and/or hydroisomerization and distillation, resulting in a high yield of high-quality middle distillate products such as jet fuel or diesel fuel. The heavy hydrocarbon products can also be upgraded to specialty products such as solvents, drilling fluids, waxes, or lube base oils due to the high purity of the Fischer Tropsch products.

Processes that convert light hydrocarbons to heavier hydrocarbon products generally have three steps: 1) Conversion of light hydrocarbon feedstock to synthesis gas comprising carbon monoxide and hydrogen; 2) conversion of the synthesis gas to heavy hydrocarbons via the Fischer Tropsch reaction; and 3) hydroprocessing the heavy hydrocarbon product to one or more finished hydrocarbon products.

In the synthesis step, use is made of a synthesis catalyst such as a Fischer Tropsch catalyst. Fischer Tropsch catalyst are typically composed of Iron or Cobalt deposited on an inorganic oxide support such as silica, alumina, titania, or zirconia with various promoters such as ruthenium, platinum, rhenium, and other metals in a minor amount to enhance the catalyst performance. Examples of such Fischer Tropsch catalyst can be found in U.S. Pat. Nos. 9,180,436 and 9,358,526. As Fischer Tropsch catalyst age they lose activity and must be conditioned to recover as much activity as possible.

Fischer Tropsch catalyst are costly to manufacture and must be cost effective in the overall process economics. As such, the user must consider the total catalyst life, to average the cost of the catalyst over a large volume of products so that the cost of catalyst per unit of product is acceptable. The Fischer Tropsch catalyst typically has a stable but constantly decreasing rate of activity and must be managed by increasing temperature to maintain stable activity over a practical temperature range. The operator of a gas-to-liquids process may offset loss of activity by raising temperature, but as temperature increases the amount of undesirable products (typically light hydrocarbons, i.e. C1-C4) causes a reduction in desirable products (C5+) and the process must be stopped to either regenerate or replace the catalyst. Because the catalyst is expensive and the operator has the need to get the maximum yield of products for a single charge of catalyst, it is necessary to regenerate the catalyst if possible and as many times as possible.

Catalyst regeneration can be thought of as a way to clean and restructure the surface of the catalyst to return it, as much as possible, to the condition of fresh catalyst. Various methods known to one skilled in the art have been used to regenerate a Fischer Tropsch catalyst including a simple hydrogen treatment step. A hydrogen treatment would typically be done at elevated temperature and at low pressure. The logic of using hydrogen is based on the fact that it may be useful to remove heavy hydrocarbons and reduce any oxidized surface cobalt. While this is true, it has typically been found that a simple hydrogen step is of relatively low effectiveness for recovery of lost activity.

Another method known to one skilled in the art is to use a reduction, oxidation, reduction (ROR) method to regenerate a deactivated Fischer Tropsch catalyst. See, for example U.S. Pat. No. 4,729,981. The ROR method has demonstrated efficacy as a means to restore Fischer Tropsch catalyst activity, possibly because the hydrogen step removes heavy hydrocarbons from the catalyst pores while the oxidation step restructures the metal surface atoms improving dispersion and the final reduction step converts the metal back to the active reduced form. Hydrogen is typically used in the first and last reduction steps of the ROR process while the oxidation step may use an inert gas with a very small amount of oxygen.

Based on the foregoing, it is desirable to provide an enhanced method to maintain the activity of a Fischer Tropsch catalyst including initial activation and subsequent regenerations.

It is further desirable to use a ROR method to regenerate a Fischer Tropsch catalyst with minimal additional equipment and cost. For a Fischer Tropsch reactor that is designed to operate in a recycle mode, it is therefore desirable to use the existing equipment such as the recycle compressor and product knockout drums to regenerate the catalyst.

SUMMARY OF THE INVENTION

In general, in a first aspect, the invention relates to a method to activate or regenerate a Fischer Tropsch catalyst used in a gas-to-liquids process. The method may comprise: conducting a ROR (reduction oxidation reduction) activation or regeneration of the Fischer Tropsch catalyst at an elevated pressure near a normal operating pressure of the Fischer Tropsch catalyst, where the ROR comprises a reduction step, an oxidation step, and a second reduction step; and adding one or more diluent gases to a recycle loop during the ROR, the recycle loop comprising a recycle compressor with design limits for mole weight and/or hydrogen concentration, thereby adjusting the mole weight and/or hydrogen concentration to satisfy the design limits of the recycle compressor. Conducting the ROR may specifically occur at an elevated pressure above 100 psig, preferably above 200 psig.

The one or more diluent gases may comprise argon, light saturated hydrocarbon gases including C1 to C3 gases, or a combination thereof added during the reduction step and the second reduction step. The one or more diluent gases added during the reduction step and the second reduction step may explicitly exclude nitrogen and carbon dioxide. The diluent gases may comprise nitrogen, helium, argon, carbon dioxide, or a combination thereof added during the oxidation step. Specifically, the one or more diluent gases may comprise nitrogen and helium or nitrogen and carbon dioxide added during the oxidation step.

The gas-to-liquids process may use a feed gas, which may be natural gas, biogas, landfill gas, coal seam gas, or associated gas. The recycle loop may have a flow rate during the ROR that is higher than the flow rate during normal operation. The recycle compressor may have a polytropic head that is lower during the ROR than during normal operation. The recycle compressor may be a centrifugal compressor.

The addition of one or more diluent gases added during the ROR may avoid material changes to the recycle compressor. The reduction step and second reduction step may be conducted at a temperature between 450 F and 650 F. The oxidation step may be conducted at a temperature between 350 F and 550 F.

BRIEF DESCRIPTION OF THE DRAWINGS

FIG. 1 is a simple process diagram according to the present invention.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a method to activate or regenerate a Fischer Tropsch catalyst used for the production of heavy hydrocarbon products from light gaseous hydrocarbon feeds such as natural gas, associated gas, coal seam gas, landfill gas, or biogas.

As noted above, it is an object of the present invention to use a ROR method to regenerate a Fischer Tropsch catalyst with minimal additional equipment and cost. For a Fischer Tropsch reactor that is designed to operate in a recycle mode, it is therefore desirable to use the existing equipment such as the recycle compressor and product knockout drums to regenerate the catalyst. Since the Fischer Tropsch recycle process may be designed for a relatively low pressure drop and high flow, a centrifugal compressor may be a likely choice for the system. Centrifugal compressors must be designed for the operating pressure and gas conditions. While a centrifugal compressor is the preferred choice of the present invention, any type of compressor known to one skilled in the art may be used and still be within the scope of the invention.

If the Fischer Tropsch reactor is designed to operate on a once thru basis without recycle, the activation and regeneration may be operated in a recycle mode. In this case, a recycle compressor may be provided for the purpose of activation and regeneration. For the purpose of the present invention, the reactor may be considered as operating in a recycle mode even if recycle is used only for activation and regeneration. If the process is designed wherein recycle is used only for activation and regeneration, it is still desirable to use inert gases to dilute the reduction and oxidation gases as provided herein.

The design basis for the recycle compressor may be for the normal steady state operation of the Fischer Tropsch reaction. To keep the method simple and the cost low, operating conditions of the ROR method may be set so that the same compressor used in normal operation, if one is used in normal operation, can be used for the ROR operation. Normally the recycle compressor will operate with a mole weight in the range of approximately 18 to 30. The recycle gas in normal Fischer Tropsch operation may consist of unreacted hydrogen and carbon monoxide and system inert gases which may include nitrogen, carbon dioxide, and light hydrocarbons. If the feed gas being processed is a biogas, it may contain large amounts of carbon dioxide, which will make the recycle gas stream mole weight higher. If the feed gas is natural gas, methane will build up as the inert gas and the mole weight will be lower. In all cases, the mole weight of the normal recycle stream is much higher than that of hydrogen, which is the gas needed in the two reduction steps of the ROR method. Since hydrogen has a mole weight of 2, it may not be possible to use the existing process recycle compressor to operate the ROR method without substantially changing the composition of the gas. An inert gas can be added to the hydrogen reduction stream to increase the mole weight of the gas so that the process compressor can be used for both operations. Without the addition of an inert gas, the only other options are to provide a separate compressor for ROR recycle or operate the reduction and oxidation steps on a once through basis. Both of these options would add substantial cost. Typically, nitrogen is the inert gas that has been used in activation and regeneration methods. For example, nitrogen is described as a reduction diluent in U.S. Pat. No. 4,729,981 in claim 18.

To use the existing process compressor for a ROR activation or regeneration step, it is also necessary to carry out the activation or regeneration at a pressure that is close to the normal reactor operating pressure. Typically, the Fischer Tropsch process is operating at moderate pressures in the range of 200 psig to 450 psig. Most activation and regeneration methods that have been described are done at relative low pressure, such as less than 100 psig, or do not address pressure. It is an objective of the present invention to provide a method for activation or regeneration of a Fischer Tropsch catalyst at or near normal operating pressure of the Fischer Tropsch reaction and at or near the mole weight of the recycle stream during normal operation so that the process compressor used in normal operation can be used in the ROR method.

A series of experiments were carried out to determine the effect of inert gas addition to a ROR method for activating or regenerating a Fischer Tropsch catalyst. The experiments were done at 350 psig so that the effect of operating at or near normal operating pressure for a Fischer Tropsch process was considered. Gases that were thought to be inert were used to dilute the hydrogen stream in the ROR method. In all cases, nitrogen was used as the diluent gas in the oxidation step and oxygen was introduced at or below 2%. The results of these experiments are summarized in Table 1 below.

After the ROR method was completed the catalyst was operated for 500 hours at which point the relative activity of the catalyst was measured and is shown as a kinetic constant Kt in the last column of Table 1, where the value of Kt is relative to the activity of the catalyst. The data in Table 1 demonstrates that the ROR method can be effectively operated with a wide range of diluent gas type and concentration.

TABLE 1

ROR activation with inert gases

| | Reduction | Oxidation | Reduction | Activity Kt at 500 hours |
|---|---|---|---|---|
| Run 1 standard | H2 (100%) | <2% O2 | H2 (100%) | 1.89 |
| Run 2 | N2—H2 (50:50) | <2% O2 | N2:H2 (50:50) | 0.85 |
| Run 3 | CH4—H2 (50:50) | <2% O2 | CH4—H2 (50:50) | 1.55 |
| Run 4 | C2—H2 (60:40) | <2% O2 | C2—H2 (60:40) | 1.78 |
| Run 5 | CO2—H2 (70:30) | <2% O2 | CO2—H2 (70:30) | 0.92 |
| Run 6 | Ar—H2 (50:50) | <2% O2 | Ar—H2 (50:50) | 1.75 |

It has been surprisingly found that when operating a ROR method at elevated pressure such as normal operating pressure for a Fischer Tropsch process, nitrogen and carbon dioxide are not acceptable as inert gases to use in the reduction steps of the ROR method of the present invention. In fact, one could conclude that at elevated pressure, nitrogen and carbon dioxide do not act as an inert gas (for the reduction steps) in the ROR activation or regeneration method, but in fact act to inhibit the activation or regeneration of a Fischer Tropsch catalyst. It may be theorized that at elevated pressure, nitrogen (in the presence of hydrogen) will produce a small amount of ammonia which may inhibit the activation or regeneration of the catalyst and carbon dioxide may produce residual carbon on the surface which will also inhibit the activation or regeneration of the catalyst. Regardless of the explanation, it is desirable to avoid using nitrogen or carbon dioxide in the reduction steps of a ROR treatment for a Fischer Tropsch catalyst at elevated pressure.

The other experiments prove that an effective ROR treatment can be done with common gases that should be readily available to fully activate or regenerate a Fischer Tropsch catalyst while using an existing recycle compressor designed for normal operation. Since the gas is completely recycled during the ROR operation and the inert gas is not consumed, it takes a relatively small amount of the inert gas for the process. Inert gas concentration in the reduction step may vary from 5% to 95% as needed to meet the process and compressor requirements. In the oxidation step, inert gases are typically 98 to 99.5%.

A centrifugal compressor is generally considered to develop a constant differential polytropic head at a given flow rate. Polytropic head is highly dependent on mole weight and therefore it is necessary to maintain the mole weight at or near the design point of the compressor. Small changes in mole weight may be acceptable in the process, for example+/−20%, but such changes need to be accounted for in the design, with design limits approved by the compressor manufacturer. Therefore, to use the compressor designed for normal Fischer Tropsch operation in a recycle mode for ROR service, if it is a centrifugal compressor, will require modification of the ROR gas composition during the ROR procedure to meet the mole weight limits of the compressor.

In the reduction mode, it is desirable to use a relatively inert gas added to hydrogen for reduction of the catalyst. Many examples in the literature use nitrogen as an inert gas for reduction of a Fischer Tropsch catalyst. It has now been found that nitrogen is not a good inert gas at elevated pressure and in fact may not be inert as it produces a much less effective activation or regeneration of a Fischer Tropsch catalyst, particularly at elevated pressure in the range of normal operating pressure of the Fischer Tropsch reaction, i.e. above 100 psig. In addition, it has been found that carbon dioxide is also not effective as an inert gas for a ROR activation or regeneration of a Fischer Tropsch catalyst at elevated pressure. Therefore, other gases can and should be used.

Other types of compressors can be used for the recycle operation, such as a positive displacement compressor. With a positive displacement compressor, use of diluent may be less important for mole weight control and more useful to avoid a material change. For example, 100% hydrogen may require a special alloy material making the compressor more expensive but a lower concentration does not require the material change. In this case, even though there is not a mole weight limit and it may be possible to use a positive displacement compressor with 100% hydrogen, it may be less expensive to design the compressor for a diluted hydrogen concentration and fall within the scope of the present ROR method. The intent of the present invention is to give design and operation flexibility so that the best compressor can be used for both normal operation and the ROR method.

The oxidation step of the ROR method of the present invention can use nitrogen as an inert gas and in fact it is the first choice for the inert gas. However, if the process design requirements of the recycle compressor for the Fischer Tropsch reactor results in a relatively low mole weight gas, below that of nitrogen, it may be necessary to use a gas with a lower mole weight. This gas cannot be a combustible gas, therefore light hydrocarbons such as methane are not acceptable for the oxidation step. In this case, helium can be used to reduce the mole weight of the oxygen containing gas to meet the requirements of the recycle compressor. If the mole weight of the gas used in the oxidation step is too low, carbon dioxide can be added to the gas to increase the mole weight of the gas. With these optional changes the gas mole weight for reducing gas or oxidizing gas can be modified over a very broad range to stay within the mole weight limits of a compressor designed for normal Fischer Tropsch recycle operation.

It is not required that the flowrate of the compressor during a ROR operation be the same as the flowrate in the normal Fischer Tropsch synthesis mode. In fact, it may be advantageous to operate at a higher flowrate during a ROR operation. The compressor flowrate for a centrifugal compressor will go up if the polytropic head goes down, which will happen if the mole weight of the gas is higher or the pressure drop of the system is lower. The pressure drop will naturally go down in the ROR mode since no liquid products are being produced during the operation of the method which are normally produced in the synthesis mode. Addition of one or more inert gases selected from helium, argon, nitrogen, carbon dioxide, and light saturated hydrocarbons can be used to set the mole weight of the gases used in the ROR method of the present invention to stay within the limits of the recycle compressor designed for the normal Fischer Tropsch synthesis operation. Such modification may result in raising the mole weight of the ROR gas and thus increasing the flow rate during the ROR operation when using a centrifugal compressor. As a rule, helium, nitrogen, and carbon dioxide are diluents used only in the oxidation mode (argon could also be used), whereas argon and light saturated hydrocarbons may be used as diluents in the reduction mode. Nitrogen and carbon dioxide are specifically not used in the reduction mode as they have been discovered to interfere with the reduction process at elevated pressures of the present invention. If light hydrocarbons heavier than propane are used, they may have to be heated to keep them in the vapor phase which can become self-limiting. Also, since butane has a mole weight of 60 it will not be useful as a diluent since it has a mole weight much higher than needed to match the process compressor design case. Therefore, the practical limitation for use of light hydrocarbons as diluents in the present invention is C1 to C3 saturated hydrocarbons.

The present invention is directed at a method to activate or regenerate a Fischer Tropsch catalyst used in a gas-to-liquids process, operating in a recycle mode using the Fischer Tropsch process recycle compressor in the ROR step comprising:

1) Conducting a ROR activation or regeneration of a Fischer Tropsch catalyst at an elevated pressure above 100 psig, preferably above 200 psig that is near the normal operating pressure of the Fischer Tropsch catalyst; and
2) Adding one or more diluent gases to the recycle loop during the ROR steps to maintain the mole weight or hydrogen concentration of the gas to be within the design limits of the recycle compressor.

Referring to FIG. 1, process system (20) describes a preferred embodiment of the present invention. A gaseous feed comprising hydrogen and carbon monoxide (1) may be fed to Fischer Tropsch reactor (2). Heavy hydrocarbon products (9) may be removed from hot separator (3). Non-condensable gases and light hydrocarbons may be cooled in cooler (4) and condensable liquids including water (10) and some of the hydrocarbon products (11) may be recovered in separator (5). Light hydrocarbon products and water removed as liquid products and non-condensable gases may be either purged (6) or recycled via recycle compressor (7) returning unreacted syngas components for further reaction in reactor (2). The recycle operation may make it possible to run the Fischer Tropsch reactor at a limited conversion per pass so that water partial pressure can be limited within the reactor and may also allow for operation of the system at a total conversion at or above 80% and preferably above 90%, which is desirable for economic purposes.

During a ROR procedure, the feed gas may be stopped and replaced with a regeneration gas (8). The gas may be brought to the operating pressure and flow may be established with recycle compressor (7). During the ROR operation, there may be no condensable gases with the exception of a small amount of water that is produced in the reduction mode. A water dryer may be added to the recycle loop to keep the reduction gas very dry. The purge line (6) will normally be kept closed so the ROR is a closed loop. Once the loop is pressured up there is only need for a small amount of gas to maintain the pressure. In the reduction mode, there may be a small amount of hydrogen consumed as metals on the Fischer Tropsch catalyst are converted from the oxide phase to a reduced phase. In the oxidation step, oxygen is consumed as the metal on the catalyst is converted back to the oxide phase. Relative to the flow in the recycle loop, these are very small volumes and they may be maintained with addition of any gases that are consumed to the otherwise closed system.

In the first reduction process, the system may be pressured up to a pressure that is at or near the normal operating pressure of the Fischer Tropsch reactor with hydrogen and one or more inert gases so that the gas stream meets the mole weight or dilution requirements of the recycle compressor. As the temperature is ramped up to the required reduction temperature, hydrogen may be continuously added to maintain the hydrogen concentration as some of the hydrogen is consumed in the reduction process. In the first reduction step of an activation process, this addition may be substantial. In a regeneration process, the Fischer Tropsch catalyst may be already in the reduced state, so the hydrogen consumption may be relatively low but necessary as it removes heavy hydrocarbons and prepares the catalyst for the oxidation and final reduction steps. After the reduction step reaches the maximum temperature (between 450 F and 650 F), it may be held for a specified time between 8 and 48 hours. After the reduction step is completed, the reactor temperature may be reduced to a lower temperature to safely transition to the oxidation gas. A good temperature for the transition is below 250 F. After the reactor is cooled, the gas may be purged with an inert gas such as nitrogen and then an oxygen-containing gas, preferably air, may be pulsed into the reactor while maintaining the recycle flow. The oxygen pulsing may be done while observing temperature pulses in the reactor and may be done at a low rate so that the exotherm in the reactor is less than 50 F. After the reactor exotherm is very low, i.e. below 5 F, the temperature may be ramped up to the maximum temperature for the oxidation step (between 350 F and 550 F) and held at this temperature with approximately 0.5% to 2% oxygen in the gas for between 8 hours and 48 hours. After the oxidation step is completed, the reactor temperature may be reduced to a lower temperature to safely transition back to the reduction mode. The reactor may be purged with the inert gas or gases selected for the reduction mode until oxygen levels are very low. Hydrogen may be added to the desired level and the reactor temperature may be ramped to the target temperature (450 F to 650 F) and held for a specified time between 8 and 48 hours.

When the ROR process is completed, the temperature may be reduced to a safe operating temperature to start the Fischer Tropsch process. The feed synthesis gas may be added to the system and the temperature may be slowly increased so that the conversion in the Fischer Tropsch reactor is brought up to the target range for stable operation.

Whereas, the devices and methods have been described in relation to the drawings and claims, it should be understood that other and further modifications, apart from those shown or suggested herein, may be made within the spirit and scope of this invention.

What is claimed is:

1. A method to activate or regenerate a Fischer Tropsch catalyst used in a gas-to-liquids process, the method comprising:
    conducting a ROR (reduction oxidation reduction) activation or regeneration of the Fischer Tropsch catalyst at an elevated pressure near a normal operating pressure of the Fischer Tropsch catalyst, where the ROR comprises:
        a reduction step;
        an oxidation step; and
        a second reduction step; and
    adding one or more diluent gases to a recycle loop during the ROR, the recycle loop comprising a recycle compressor with design limits for mole weight and/or hydrogen concentration, thereby adjusting the mole weight and/or hydrogen concentration to satisfy the design limits of the recycle compressor.
2. The method of claim 1 where conducting the ROR occurs at an elevated pressure above 100 psig.

3. The method of claim 1 where conducting the ROR occurs at an elevated pressure above 200 psig.

4. The method of claim 1 where the one or more diluent gases comprise argon, light saturated hydrocarbon gases including C1 to C3 gases, or a combination thereof added during the reduction step and the second reduction step.

5. The method of claim 1 where:
    the one or more diluent gases comprise one or more diluent gases added during the reduction step and the second reduction step; and
    the one or more diluent gases added during the reduction step and the second reduction step explicitly exclude nitrogen and carbon dioxide.

6. The method of claim 1 where the one or more diluent gases comprise nitrogen, helium, argon, carbon dioxide, or a combination thereof added during the oxidation step.

7. The method of claim 1 where the gas-to-liquids process uses a feed gas and where the feed gas is natural gas, biogas, landfill gas, coal seam gas, or associated gas.

8. The method of claim 1 where the one or more diluent gases comprise nitrogen and helium added during the oxidation step.

9. The method of claim 1 where the one or more diluent gases comprise nitrogen and carbon dioxide added during the oxidation step.

10. The method of claim 1 where the recycle loop has a flow rate during the ROR that is higher than the flow rate during normal operation.

11. The method of claim 10 where the recycle compressor has a polytropic head during normal operation and where the recycle compressor has a polytropic head that is lower during the ROR than during normal operation.

12. The method of claim 1 where the recycle compressor is a centrifugal compressor.

13. The method of claim 1 where the addition of one or more diluent gases added during the ROR avoids material changes to the recycle compressor.

14. The method of claim 1 where the reduction step and second reduction step are conducted at a temperature between 450 F and 650 F.

15. The method of claim 1 where the oxidation step is conducted at a temperature between 350 F and 550 F.

* * * * *